United States Patent [19]

Oosaka et al.

[11] Patent Number: 4,782,255
[45] Date of Patent: Nov. 1, 1988

[54] STEPPING MOTOR AND MAGNETIC DISC REPRODUCING APPARATUS USING THE SAME

[75] Inventors: Shigenori Oosaka; Naoki Takatori, both of Tokyo, Japan

[73] Assignee: Fuji Photo Film Co., Ltd., Kanagawa, Japan

[21] Appl. No.: 68,295

[22] Filed: Jul. 1, 1987

[30] Foreign Application Priority Data

Jul. 1, 1986 [JP] Japan .................. 61-152777

[51] Int. Cl.$^4$ ............................................ H02K 11/00
[52] U.S. Cl. .................. 310/68 R; 310/68 B; 310/49 R; 310/156
[58] Field of Search .............. 310/49 R, 49 A, 67 R, 310/68 R, 68 B, 254, 257, 268

[56] References Cited

U.S. PATENT DOCUMENTS

| | | | |
|---|---|---|---|
| 4,242,608 | 12/1980 | Ishigaki et al. | 310/68 B X |
| 4,455,516 | 6/1984 | Furusho | 310/156 X |
| 4,459,087 | 7/1984 | Barge | 310/49 R X |
| 4,639,648 | 1/1987 | Sakamoto | 310/68 R X |
| 4,658,162 | 4/1987 | Koyama et al. | 310/68 R |
| 4,667,122 | 5/1987 | Muller | 310/68 R |
| 4,668,884 | 5/1987 | Amo et al. | 310/68 R X |

*Primary Examiner*—Mark O. Budd
*Attorney, Agent, or Firm*—Sughrue, Mion, Zinn, Macpeak & Seas

[57] ABSTRACT

A stepping motor for use in a magnetic disc reproducing apparatus for causing radial scanning movement of a magnetic head relative to a magnetic disc having many picture information recorded on concentric tracks, comprises a casing, a rotor, stator coils to which current is supplied according to a sequence of phase cycles, and a rotor positions detector which includes two electrically-connected contactors mounted on the rotor, and an annular conductor pattern and an arcuate conductor pattern provided in the casing to make continuous and temporary contact with the respective contactors. The arcuate conductor pattern covers a range corresponding to an angle through which the rotor rotates in a predetermined one cycle among the phase cycles of current supply to the coils.

6 Claims, 5 Drawing Sheets

STEPPING MOTOR AND MAGNETIC DISC REPRODUCING APPARATUS USING THE SAME

BACKGROUND OF THE INVENTION

1. Field of the Invention

This invention relates to a stepping motor and a magnetic disc reproducing apparatus using the same.

2. Description of the Prior Art

An electronic still camera using a magnetic disc in lieu of a conventional film using a silver halide photographic material as a photosensitive material, and an apparatus for reproducing picture information recorded by the electronic camera on such a magnetic disc are proposed now as one form of magnetic recording and reproducing apparatus.

In such an electronic still camera (a recording apparatus) using a magnetic disc as a recording medium, a magnetic head is disposed opposite to the magnetic disc in a relation closely adjacent to or making contact with the magnetic disc rotating at a high speed. This magnetic head is advanced for stepwise scanning operation each time the magnetic disc makes one revolution, so that many picture information can be radially recorded on concentric tracks.

In the playback mode reproducing the many picture information recorded on the concentric tracks of the magnetic disc, a stepping motor is commonly used as a means for driving a magnetic head in a reproducing apparatus. That is, when a specific number of pulses corresponding to the pitch between the tracks are applied to the stepping motor, the magnetic head is moved from the position on one track to that on the next track. Also, tracking control can be attained according to a so-called climbing servo action based on a reproduced envelope detected by the magnetic head.

One form of such a reproducing apparatus will be described with reference to FIGS. 9 to 11. referring to FIGS. 9 to 11, a lead screw shaft 2 forming part of a scanning mechanism is rotatably journalled in bearings 3 on a bottom plate of a casing 1 of the magnetic disc reproducing apparatus. A pre-loading spring 4 is interposed between the lead screw shaft 2 and one of the bearings 3 to absorb any play of the bearings 3. This lead screw shaft 2 is formed at its middle part with an externally threaded portion 5 having an effective length larger than the scanning length of a magnetic head 19 (described later), and a pair of bushes 6 are fitted on both end portions of the lead screw shaft 2 to provide a sliding-movement guide having a diameter larger than that of the externally threaded portion 5. A gear 7 is mounted on one end (the left-hand end in FIG. 10) of the lead screw shaft 2 to rotate the lead screw shaft 2, and a head-driving stepping motor 9 provided with a pinion 8 is mounted on a side plate of the casing 1. An idle pinion 10 and an idle gear 11 are coaxially and integrally mounted between the gear 7 and the pinion 8 as a drive force transmission means, so that drive force of the stepping motor 9 can be transmitted to the lead screw shaft 2.

A scanner arm 12 is slidably mounted at a part adjacent to its base end on the bushes 6 which act as the guide guiding the sliding movement of the lead screw shaft 2 therealong. In order to prevent rotating movement of the scanner arm 12 around the bushes 6, a hole 13 penetrates vertically through a portion of the base end of the scanner arm 12 remote from the lead screw shaft 2, and a steel ball 14 fitted in this hole 13 is pressed by a leaf spring 14' upward onto an associated portion of the casing 1. Thus, a counter-clockwise reaction force is produced in the scanner arm 12, and a roller 15 interposed between a portion of the scanner arm 12 relatively near the free end thereof and an associated portion of the casing 1 bears this reaction force.

The scanner arm 12, which is slidable in the scanning direction only, has, at its lower surface between the bushes 6, a leaf spring 16 fixed by machine screws thereto in a relation parallel to the lead screw shaft 2, and a needle holder 17 holding a needle 18 thereon is fixed by a machine screw to this leaf spring 16, so that the needle 18 engageable with the externally threaded portion 5 of the lead screw shaft 2 can be guided along the threaded portion 5 and brought into intimate pressure engagement with the threaded portion 5.

A magnetic head 19 is mounted on the free end portion of the scanner arm 12. This magnetic head 19 is located opposite to a magnetic disc 22a contained in a magnetic disc pack 22 which is detachably mounted on a magnetic disc drive motor 20 installed in the casing 1 and which is positioned by positioning pins 21. A counter 23 is provided on the pack 22.

In the prior art reproducing apparatus described above, picture information recorded on a desired track is commonly reproduced by returning the magnetic head 19 once to the position on an outermost or corresponding track (referred to hereinafter as a track No. zero) and then moving the scanner arm 12 by the stepping motor 9 until the magnetic head 19 is positioned on the desired track. For this purpose, a doctor 24 is provided on the scanner arm 12, and a limit switch 25 is provided on the casing 1 as shown in FIG. 10. It has been decided that, when the doctor 24 contacts the limit switch 25, the magnetic head 19 has returned to the position on the track No. zero.

As is well known in the art, the interval or pitch between the tracks formed on the magnetic disc 22a is 100 $\mu$m, and the track width and the guard band width are 60 $\mu$m and 40 $\mu$m respectively. This means that an accuracy as high as the order of microns is required for mounting the limit switch 25. Therefore, a long period of time has been required for adjusting the position of the limit switch 25, and yet it has been difficult to fully accurately adjust the position of the limit switch 25.

SUMMARY OF THE INVENTION

It is an object of the present invention to provide a stepping motor preferably used in an apparatus of the kind described above so as to obviate the prior art defect pointed out above.

Another object of the present invention is to provide a magnetic disc reproducing apparatus using such a stepping motor.

In accordance with one aspect of the present invention, there is provided a stepping motor comprising a casing, a rotor stator coils disposed opposite to the rotor in the casing, means for supplying current to the coils according to a sequence of predetermined phase cycles to rotate the rotor through a predetermined angle in each phase cycle, and means for detecting the presence of the rotor in a predetermined one cycle among the phase cycles. In the stepping motor of the above character, the detecting means includes two contactors mounted on the rotor and electrically connected to each other, an annular conductor pattern provided in the casing to make continuous contact with one of the contactors, and an arcuate conductor pattern provided in the casing to make temporary contact with the other of the contactors, the arcuate conductor pattern covering a range corresponding to the angle through which the rotor rotates in one cycle among the phase cycles of current supply to the coils.

In accordance with another aspect of the present invention, there is provided a magnetic disc reproducing apparatus comprising a stepping motor used as drive means for causing radial scanning movement of a magnetic head relative to a magnetic disc having many picture information recorded on concentric tracks, the stepping motor comprising a casing, a rotor, stator coils disposed opposite to the rotor in said casing, means for supplying current to the coils according to a sequence of predetermined phase cycles to rotate the rotor through a predetermined angle in each phase cycle, and means for detecting the presence of the rotor in a predetermined one cycle among the phase cycles.

The rotor is positioned at a position corresponding to a fixed phase in the one cycle among the phase cycles when the fixed phase is energized under a state where the annular conductor pattern and the arcuate conductor pattern electrically conduct through the two contactors.

DESCRIPTION OF THE PREFERRED EMBODIMENTS

Referred embodiments of the present invention will now be described in detail with reference to the drawings.

Figure 1:
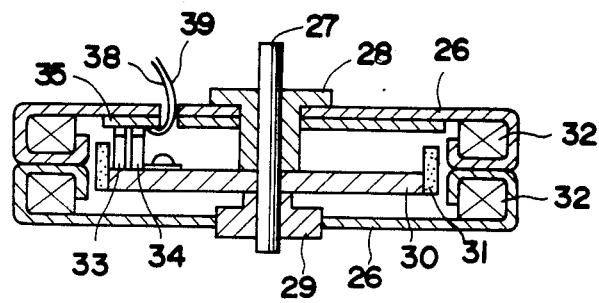
FIG. 1 is a sectional view of a first embodiment of the stepping motor according to the present invention.
Figure 3:
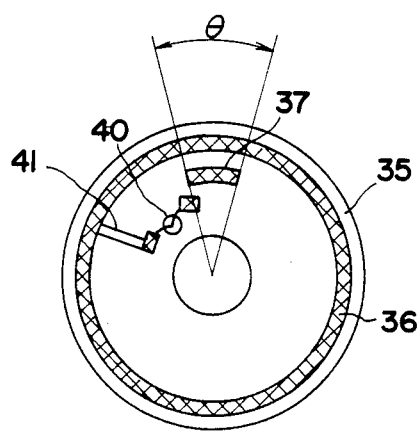
FIG. 3 is a plan view of the substrate in the first embodiment of the present invention shown in FIG. 1.

A first embodiment of the stepping motor according to the present invention is shown in FIGS. 1 and 3. That is, FIGS. 1 and 3 show an application of the present invention to a stepping motor of a so-called permanent magnet type. Referring to FIG. 1, a rotary shaft 27 journalled in bearings 28 and 29 extends rotatably through a casing 26, and a disc 30 is integrally fitted to this rotary shaft 27 and permanent magnet 31 is fixed to the outer periphery of the disc 30 to constitute a rotor. Coils 32 are opposite to the permanent magnet 31 on the inner peripheral surface of the casing 26. The permanent magnet 31 and coils 32 may be those already well known in the art. Since they operate according to a principle well known in the art, any further detailed description is unnecessary.

Two upstanding brushes 33 and 34 are provided on the rotor disc 30 as contactors and are electrically connected with each other. A substrate 35 is mounted to the upper inner surface of the casing 26. As shown in FIG. 3, the substrate 35 is formed with an annular conductor pattern 36 and an inner arcuate conductor pattern 37. Therefore, in one revolution of the rotor, the brush 33 always contacts the annular conductor pattern 36, but the brush 34 temporarily contacts the arcuate conductor pattern 37.

The arcuate conductor pattern 37 is preferably formed to cover a range corresponding to an angle $\theta$ of rotation of the rotor during one cycle among phase cycles of current supply to the coils 32. This is because, as described later, accurate positioning of the rotor becomes difficult when the angle $\theta$ is smaller than a certain value, and the rotor tends to stop at an unstable position when the angle $\theta$ is larger than the certain value. Head wires 38 and 39 are connected to the annular conductor pattern 36 and arcuate conductor pattern 37 respectively and led to the outside through a hole 40. Reference numeral 41 designates an electrical insulator for preventing short-circuit trouble.

Figure 2:
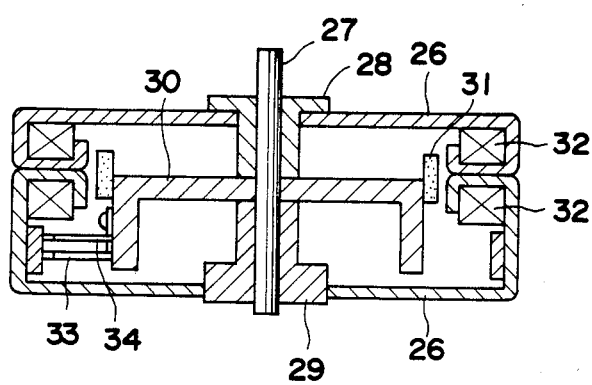
FIG. 2 is a sectional view of a second embodiment of the stepping motor according to the present invention.

A second embodiment or a modification shown in FIG. 2 is generally the same as the first embodiment, except that the brushes 33 and 34 protrude horizontally from the outer peripheral surface of the disc 30.

Figure 4:
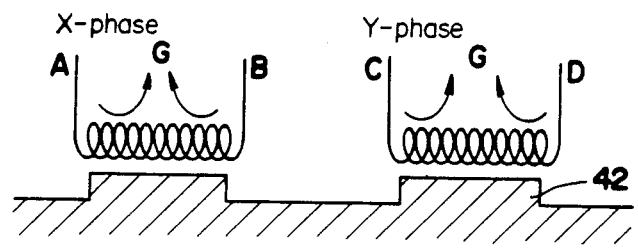
FIG. 4 illustrates a manner of energization of the stepping motor of the present invention.

A manner of energization of the first and second embodiment of the stepping motor will be described with reference to FIG. 4. The stepping motor shown in FIG. 4 is of a two-phase type using coils belonging to an X-phase and a Y-phase. Reference numeral 42 designates a rotor magnet. Therefore, in the case of two-phase energization, energizing current is supplied to the X-phase and Y-phase coils in the order of AC→CB→BD DA→AC ---, as shown in FIG. 4. In the above description, AC means that current is supplied from a terminal A toward a terminal B in the X-phase coil and from a terminal C toward a terminal D in the Y-phase coil. The same applies to CB, BD and DA in the case of two-phase energization. Also, in the case of single-phase energizing, current is supplied in the order of A→C→B→D→A→C ---, as shown in FIG. 4. In this case, the range of AC-DA or A-D is referred to as one cycle of phase cycles, and $\theta$ designates the angle through which the rotor rotates within such one cycle. As described already, the arcuate conductor pattern 37 covers the range corresponding to the angle $\theta$ of rotation of the rotor during one cycle of the phase cycles. Thus, when the arcuate conductor pattern 37 is electrically conducting with the annular conductor pattern 36 during rotation of the rotor in the case of, for example, two-phase energization, each of AC, CB, BD and DA is energized once. Therefore, when any one of AC, CB, BD and DA is energized under the state of conduction between the patterns 36 and 37, the rotor is accurately positioned at that position. Suppose, on the other hand, that the range of the arcuate conductor pattern 37 is selected to be 1.5 times as large as that of the angle $\theta$ and energizing current is supplied in the order of, for example, AC→CB→BD→DA→AC→CB under the state of conduction between the patterns 36 and 37. Since AC or CB is energized twice in such a case, there are two positions at which the rotor is to be positioned, and the actual stopping position of the rotor becomes indefinite.

Suppose further that the range of the arcuate conductor pattern 37 is selected to be ½ of the range of the angle θ and energizing current is supplied in the order of, for example, AC→CB only under the state of conduction between the patterns 36 and 37. In such a case, the rotor cannot be positioned except the energization of AC or CB. Thus, inconvenience is encountered in adjustment and driving of the stepping motor. The angle θ may be, for example, 18°.

Figure 5:
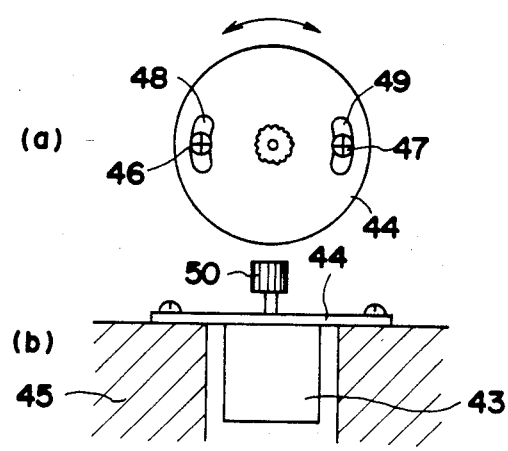
FIGS. 5($a$) and 5($b$) are a front elevation view and a sectional view respectively showing a manner of mounting the stepping motor of the present invention, in an embodiment of the magnetic disc reproducing apparatus according to the present invention.
Figure 6:
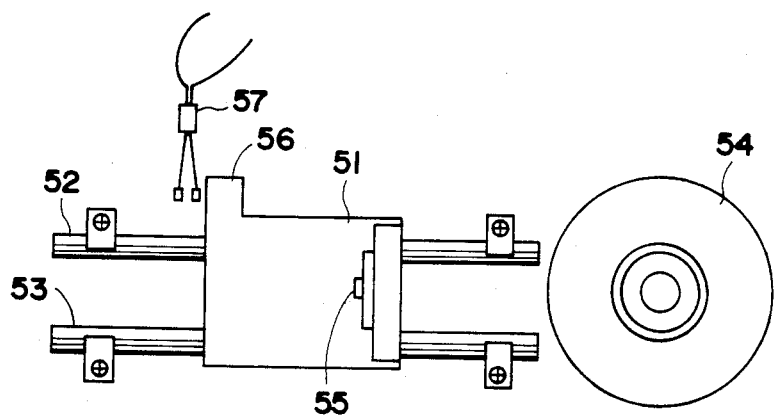
FIG. 6 is a plan view showing an arrangement of a scanner arm and a limit switch in the reproducing apparatus of the present invention.

A method of mounting, adjusting and controlling the above-described stepping motor of the present invention when used in a magnetic disc reproducing apparatus or the like will now be described. First, as shown in FIG. 5, the stepping motor designated generally by the reference numeral 43 is secured to a disc-shaped bracket 44. This bracket 44 is fastened to a casing 45 by machine screws 46 and 47 which extend through arcuate slots 48 and 49 bored respectively in the bracket 44. Thus, the stepping motor 43 can be turned in directions as shown by the arrows in FIG. 5(a) so that its mounting position can be suitably adjusted. A pinion 50 is fitted on the rotary shaft of the stepping motor 43 so that a scanner arm 51 as shown in FIG. 6 can be moved along guide bars 52 and 53 through a reduction gearing or the like (not shown). These guide bars 52 and 53 extend in the radial direction of a magnetic disc (not shown) loaded on a magnetic-disc drive motor 54. In order that a magnetic head 55 on the scanner arm 51 can be moved from a position on the outermost track of the magnetic disc to a position on the innermost track, the stepping motor 43 is required to make, for example, 2.5 to 10 revolutions. A doctor 56 is formed on the scanner arm 51, and a limit switch 57 to be engaged by the doctor 56 is provided on a causing of a magnetic disc reproducing apparatus (not shown). The position of the limit switch 57 on the casing is relatively roughly determined so that the limit switch 57 is engaged by the doctor 56 when the magnetic head 55 is brought to the position on the track No. zero.

Figure 7:
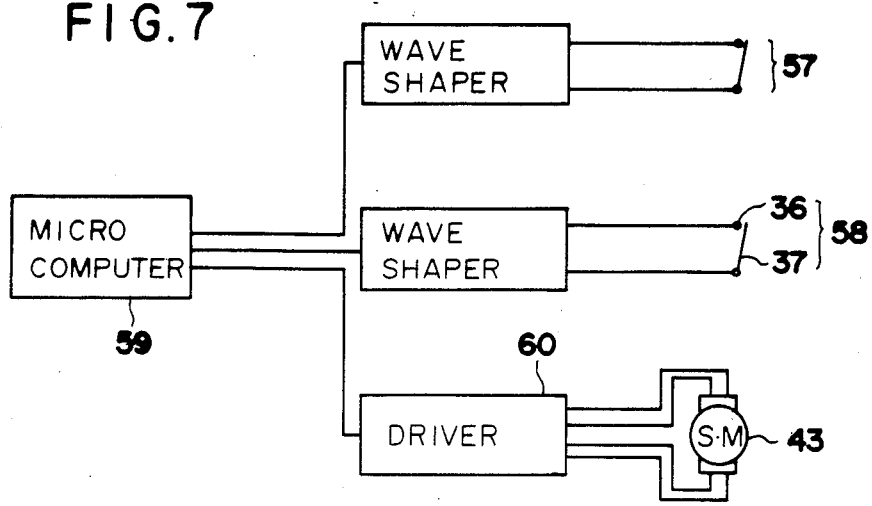
FIGS. 7 and 8 are a block diagram and a flow chart respectively showing a method for controlling the stepping motor of the present invention.
Figure 8:
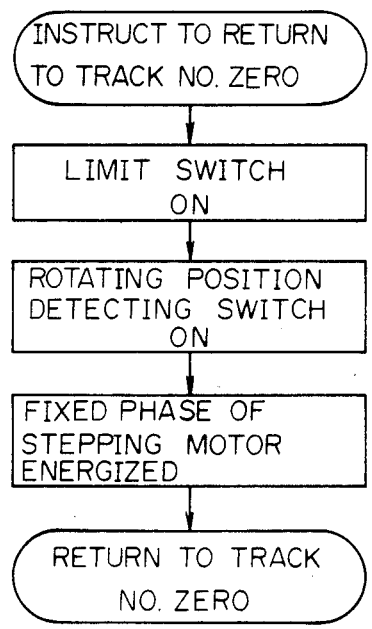
Figure 9:
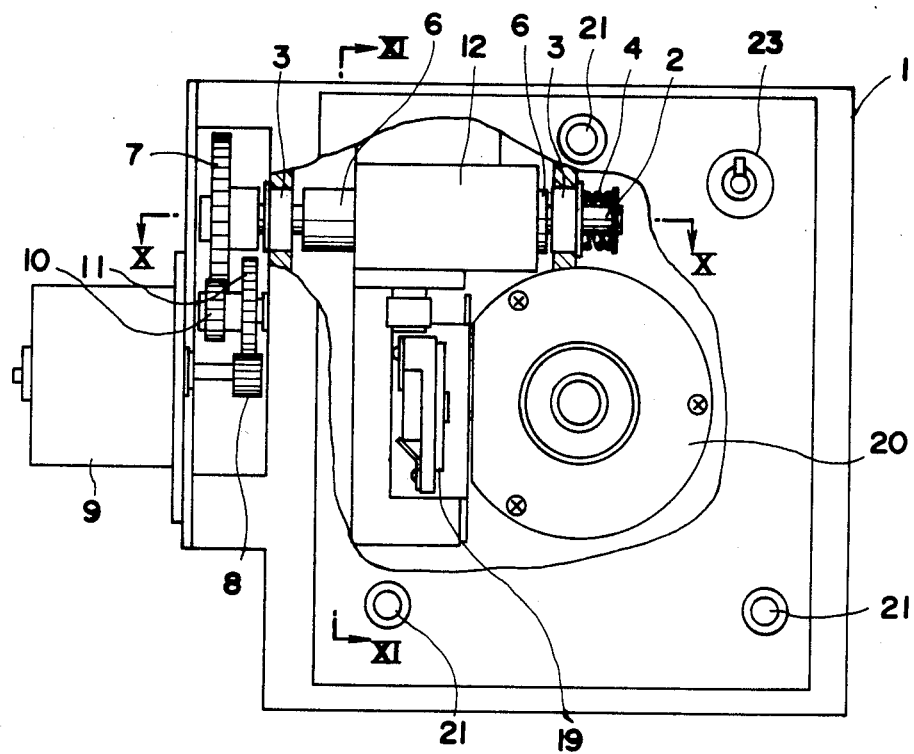
FIG. 9 is a partly cut-away, plan vie of a prior art magnetic disc reproducing apparatus.
Figure 10:
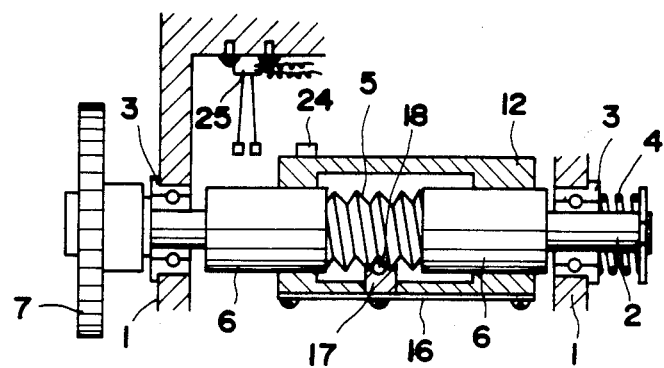
FIGS. 10 and 11 are sectional views taken along the lines X—X and XI—XI in FIG. 9 respectively.
Figure 11:
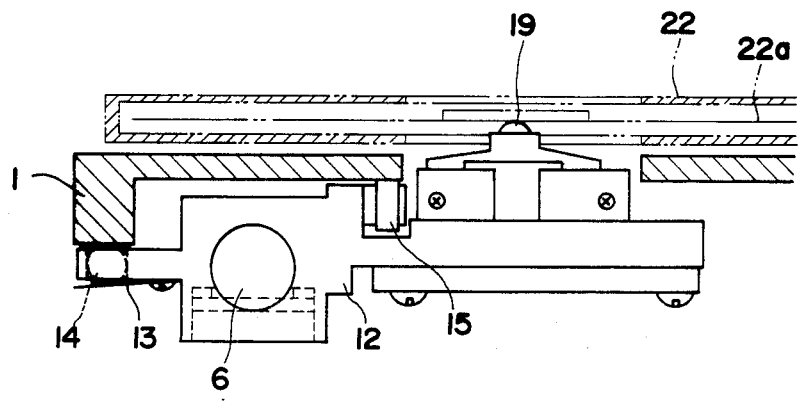

For returning the magnetic head 55 to the position on the track No. zero on the magnetic disc with high positioning accuracy in such a reproducing apparatus, the state of conduction and non-conduction between the annular conductor pattern 36 and the arcuate conductor pattern 37 is regarded to be on-off of a switch (which is referred to hereinafter as a rotating position detecting switch), and such a switch 58 is used in conjunction with the limit switch 57 to improve the positioning accuracy of the magnetic head 55. More precisely, as shown in FIGS. 7 and 8, a microcomputer 59, which decides that the magnetic head 55 is returned to the position on the track No. zero when both the limit switch 57 and the rotating position detecting switch 58 are turned on, acts to energize a fixed phase of the stepping motor 43 through a driver 60. The reason why the limit switch 57 is used in conjunction with the rotating position detecting switch 58 is that the stepping motor 43 must make plural revolutions in order to move the magnetic head 55 from the position on the outermost track to the position on the innermost track of the magnetic disc. If this limit switch 57 were not used, the magnetic head 55 could not be positioned at a specific position because the rotating position detecting switch 58 would be turned on at least twice or more. Therefore, the accuracy of the position of the limit switch 57 is not so important, and the allowance of the accuracy of its position is about the same as the distance moved by the magnetic head 55 by one revolution of the stepping motor 43 and is commonly in the order of millimeters. The limit switch 57 is unnecessary when the magnetic head 55 can be transferred from the position on the outermost track to the position on the innermost track of the magnetic disc before the stepping motor 43 makes one revolution.

The accuracy of positioning the magnetic head 55 is determined by the on-timing of the rotating position detecting switch 58, that is, the timing of conduction between the conductor patterns 36 and 37. Therefore, the mounting position of the stepping motor 43 is adjusted as described below. First, the fact that the magnetic head 55 is located at the position on the track No. zero is confirmed by means such as a microscope. Then, the stepping motor 43 is turned in one of the directions of the arrows shown in FIG. 5(a) until the brush 34 contacts the arcuate conductor pattern 37 under the above situation, and the stepping motor 43 is maintained in that position by fastening the screws 46 and 47. Then, information of the state of energization of the stepping motor 43 at the position where the brush 34 is in contact with the conductor pattern 37, that is, information of one of AC, CB, BD and DA in the case of, for example, the two-phase energization, is stored in the microcomputer 59. (Such a stored state of energization is referred to the fixed phase.)

Therefore, in order to return the magnetic head 55 to the position on the track No.zero of the magnetic disc, the fixed phase of the stepping motor 43 is energized in the state in which both the limit switch 57 and rotating position detecting switch 58 are turned on. As a result, the magnetic head 55 can be accurately positioned on the track No.zero of the magnetic disc.

The above description has referred to a two-phase stepping motor. However, it is apparent that the present invention is in no way limited to such a specific embodiment and is also applicable to stepping motors of three or more phases. The range of the arcuate conductor pattern 37 corresponds preferably to the angle through which the rotor rotates in one cycle of phase cycles as described above. However, this requirement is not necessarily strict, and the range of the arcuate conductor pattern 37 may be increased or decreased by an amount corresponding to by about half cycle.

It will be understood from the foregoing description that the present invention provides a stepping motor preferably used in a magnetic disc reproducing apparatus or the like. The stepping motor has a rotor formed with an annular conductor pattern and an arcuate conductor pattern, and the state of conduction or non-conduction between these conductor patterns is detected to detect the rotating position of the rotor, thereby accurately positioning a magnetic head or the like. The present invention also facilitates adjustment of the absolute position of a magnetic head on a magnetic disc.

Further, although brushes are provided on the rotor of the stepping motor of the present invention, it is apparent that provision of, for example, an optical sensor or a magnetic sensor on the rotor achieves the same effect.

We claim:

1. A stepping motor comprising a casing, a rotor, stator, stator coils disposed opposite to said rotor in said casing, means for supplying current to said coils over a plurality of phase cycles, energizing current being applied to said coils in a predetermined sequence during each of said cyles to rotate said rotor through a predetermined angle in each phase cycle, and means for detecting the position of said rotor based on the detection of a predetermined phase cycle among said plurality of phase cycles and the occurrence of said energizing current at a predetermined point in said sequence of energization.

2. A stepping motor comprising a casing, a rotor, stator, stator coils disposed opposite to said rotor in said casing, means for supplying current to said coils according to a sequence of predetermined phase cycles to rotate said rotor through a predetermined angle in each phase cycle, and means for detecting the presence of said rotor in a predetermined one cycle among said phase cycles wherein said detecting means includes two contactors mounted on said rotor and electrically connected to each other, an annular conductor pattern provided in said casing to make continuous contact with one of said contactors, and an arcuate conductor pattern provided in said casing to make temporary contact with the other of said contactors, said arcuate conductor pattern covering a range corresponding to the angle through which said rotor rotates in one cycle among the phase cycles of current supply to said coils.

3. A magnetic disc reproducing apparatus comprising a stepping motor used as drive means for causing radial scanning movement of a magnetic head relative to a magnetic disc having many picture information recorded on concentric tracks, said stepping motor comprising a casing, a rotor, stator coils disposed opposite to said rotor in said casing, means for supplying current to said coils according to a sequence of predetermined phase cycles to rotate said rotor through a predetermined angle in each phase cycle, and means for detecting the presence of said rotor in a predetermined one cycle among said phase cycles, said detecting means including two contactors mounted on said rotor and electrically connected to each other, and annular conductor pattern provided in said casing to make continuous contact with one of said contactors, and an arcuate conductor pattern provided in said casing to make temporary contact with the other of said contactors, said arcuate conductor pattern covering a range corresponding to the angle through which said rotor rotates in one cycle among the phase cycles.

4. A magnetic disc reproducing apparatus according to claim 3, wherein said stepping motor is mounted so that its mounting position is adjustable in its circumferential direction.

5. A magnetic disc reproducing apparatus according to claim 4, wherein a limit switch detecting returning of said magnetic head to a position on No.zero track of said magnetic disc is mounted with dimensional accuracy similar to that of the distance moved by said magnetic head in one revolution of said stepping motor, and said annular conductor pattern and said arcuate conductor pattern electrically conduct through said contactors when the mounting position of said stepping motor is adjusted in the circumferential direction and said magnetic head returns to the position on No.zero track of said magnetic disc.

6. A magnetic disc reproducing apparatus according to claim 4 or 5, further comprising a microcomputer storing the phase of the phase cycle (which is referred to as a fixed phase) of current supply to said coils of said stepping motor at the moment of returning of said magnetic head to the position on No.zero track of said magnetic disc.

* * * * *